Figure 1:
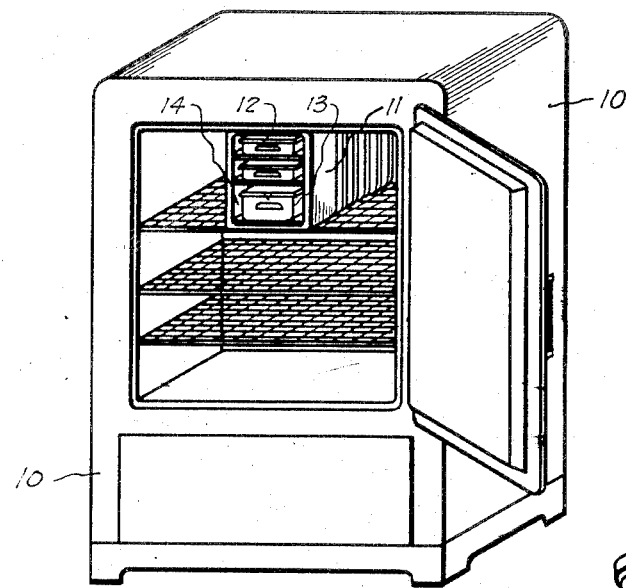

April 8, 1941.   N. GLAZER   2,237,525

TRAY

Filed Nov. 1, 1937

Inventor
Nolan Glazer

Jack A. Ashley
Attorney

Patented Apr. 8, 1941

2,237,525

UNITED STATES PATENT OFFICE 2,237,525

TRAY

Nolan Glazer, Dallas, Tex.

Application November 1, 1937, Serial No. 172,149

9 Claims. (Cl. 62—108.5)

This invention relates to new and useful improvements in trays.

It is well known that ice, and particularly that formed in cubes by mechanical refrigeration, is widely used for cooling beverages of all kinds. Its use is extensive in cooling "mixed drinks" which usually consist of a carbonated beverage, such as "ginger ale" or the like, admixed with a liquor. Also, ice, as a cooling medium, is employed in carbonated soft drinks, such as "Coca-Cola" and similar beverages.

It has been found that when a carbonated beverage is exposed to the atmosphere, it loses its carbonation due to gas escaping therefrom since the liquid itself does not have the property of retaining the gas therein. The loss of this carbonation causes the drink to become "flat" or lifeless after the same has been standing for some time in an open container. Further, the use of ordinary ice, which is merely frozen water, also detracts from the beverage for as the ice melts, the beverage is diluted, which affects the flavor and taste thereof. It is, therefore, desirable for the above reasons to carbonate the ice, that is, admix a carbonating medium with the water to be frozen, prior to the freezing of the water, whereby upon freezing, the carbonating medium is trapped or confined within the ice so formed. This carbonating medium is released only when and as the ice melts, which is after it has been placed in the beverage, and thus the beverage is maintained in a carbonated state so long as any ice remains therein.

It is one of the objects of this invention to provide an improved freezing tray wherein a carbonated ice may be formed.

An important object of the invention is to provide an improved tray adapted to fit within the freezing compartment of a mechanical refrigerator and having means for carbonating the water within said tray prior to, or during the freezing thereof, whereby a carbonated, or charged, ice is produced.

Another object of the invention is to provide an improved refrigerator tray having means for receiving a cartridge or bulb having a carbonating medium therein, with means for releasing the contents of the cartridge or bulb into the interior of the tray, whereby the liquid within the tray is carbonated or charged, and is then frozen to form carbonated ice; the construction of the tray being such that it may, if desired, be used as an ordinary ice tray in the usual manner.

Still another object of the invention is to provide an improved tray of the character described wherein commercial bulbs or cartridges containing a carbonating gas may be employed, said cartridges being sold on the open market, whereby they are easily obtained when desired.

A construction designed to carry out the invention will be hereinafter described, together with other features of the invention.

Figure 5:
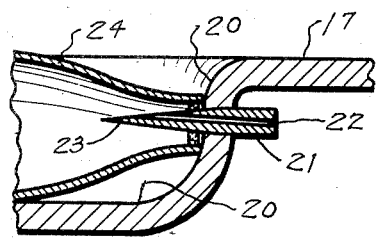
Figure 6:
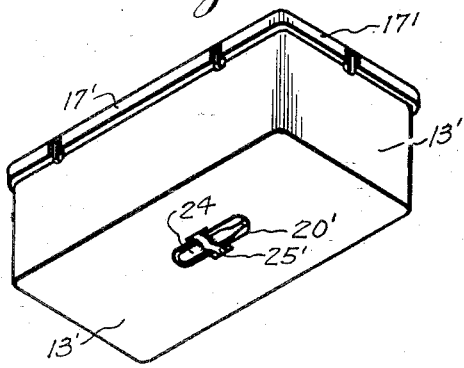
Figure 2:
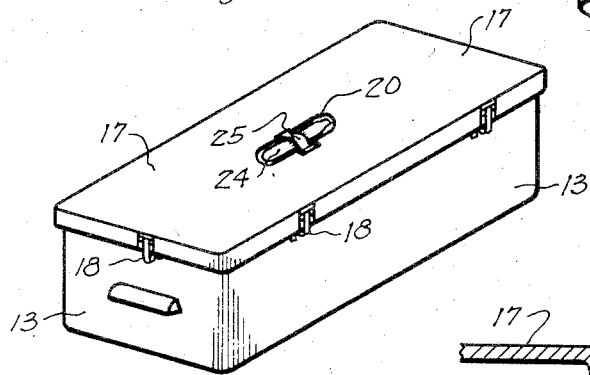
Figure 4:
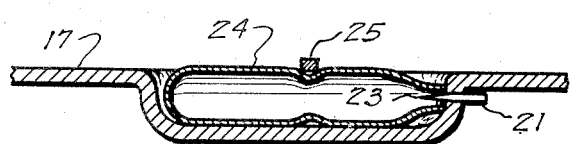
Figure 3:
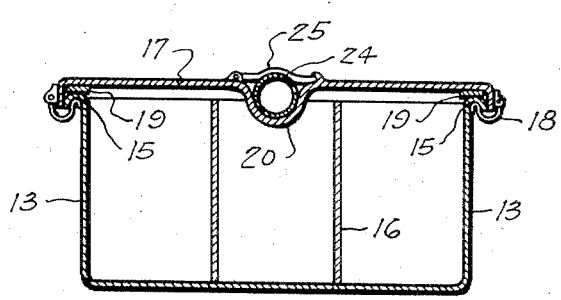

The invention will be more readily understood from a reading of the following specification and by reference to the accompanying drawing, in which an example of the invention is shown, and wherein:

Figure 1 is an elevation of an ordinary mechanical refrigerator having a tray, constructed in accordance with the invention, mounted therein, Figure 2 is an isometric view of the tray, Figure 3 is a transverse, vertical, sectional view thereof, Figure 4 is a longitudinal, sectional view of the same, Figure 5 is an enlarged, sectional view of the gas inlet nozzle, and Figure 6 is an isometric view of the bottom of a modified form of tray.

In the drawing, the numeral 10 designates a mechanical refrigerator which may be of any desired construction. The interior of the refrigerator is provided with the usual freezing compartment 11 which is adapted to receive the freezing trays 12. The trays may vary in size and number depending upon the particular construction of the refrigerator and since the refrigerator forms no part of the present invention it is subject to variation.

In carrying out the invention, a freezing tray 13, of substantially the same size and shape as the ordinary trays 12, is adapted to be inserted in one of the sections 14 in the freezing compartment. This tray is substantially rectangular in cross-section and has its top open in the usual manner. An outwardly directed, peripheral flange 15 extends around the upper top of the tray at the upper portion of the sides thereof, being preferably made integral therewith. The tray receives the usual transverse partitions 16, whereby liquid compartments are provided within the tray, so that upon freezing, ice cubes are formed.

A cover 17 closes the open top of the tray and rests on the flange 15 of the tray. Pivoted latch members 18 are mounted on the cover and are arranged to be swung so as to engage beneath the flange to firmly fasten the cover on the tray. A suitable gasket 19 is interposed between the flange 15 and the cover 17 to seal the space therebetween and thereby make the interior of the tray air-tight when the cover is in position. The partitions 16 are, of course, placed within the tray and the water to be frozen is introduced thereinto before the cover is fastened in place thereon.

For introducing a carbonating medium or gas, such as $CO_2$, into the water before the tray is inserted into the freezing compartment 11, the cover 17 is formed with a sump or recess 20 which is, preferably, located at the central portion of said cover, although it may be at any portion thereof. A nozzle 21 having an axial bore 22 is mounted in the cover and has one end extending into the interior of the tray, while its opposite end is disposed longitudinally within one end of the recess. The end 23 of the nozzle 21 which projects into the recess 20, is pointed or reduced, as is clearly shown in Figure 4.

The size and shape of the recess 20 is such that a bulb or cartridge 24 containing a carbonating gas, may be placed therein. This bulb may be purchased on the open market and is constructed of a suitable metallic body having gas, such as $CO_2$ confined therein. The bulb is tubular and has one end rounded and closed, while its opposite end is gradually reduced to form a tapered throat or neck. The reduced end of the bulb or cartridge is normally closed by a lead seal. When placed within the recess 20, the reduced end of the bulb is positioned adjacent the pointed end 23 of the nozzle 21, whereby as the bulb is placed in the recess, the reduced end of the nozzle pierces the lead seal closing the end of said bulb and the end of the nozzle enters the interior of the bulb. It is noted that the lead seal which closes the end of the bulb is relatively soft whereby when the nozzle pierces the same, the lead is forced outwardly in a radial direction, rather than cut through by the nozzle, and therefore, said lead contacts the outer surface of the nozzle to seal therearound. If desired, it would be possible to provide an elastic gasket or packing ring (not shown) at the end of the bulb abutting the outer surface of the nozzle and such ring would pack off around the nozzle as it would be confined between the end of the bulb and the wall of the recess. The gas within the bulb may then escape through the axial bore 22 of the nozzle 21 and is thus released into the interior of the tray. The bulb or cartridge is held within the recess 20 by a hinged retaining clip or bar 25 mounted on the cover and adapted to engage within an external groove provided on the cartridge.

After the cartridge is placed within the recess 20 and is pierced by the pointed end 23 of the nozzle, the tray is inserted into the section 14 of the freezing compartment 11. As soon as the nozzle 21 enters the cartridge, the gas within said cartridge is released through the bore 22 of said nozzle into the interior of the tray, and said gas admixes with the water within said tray. It is noted that the gasket 19 seals the space between the cover 17 and the flange 15 of the tray, whereby this joint is leak-proof and the gas released into the tray cannot escape. It is desirable to manually shake the tray after the gas has been released into the water therein, whereby the gas and water are thoroughly admixed and the water is saturated with the gas so as to retain the same during the freezing operation. The gas is thus forced to admix with the water and when said water is frozen, the gas is trapped or confined within the ice. Thus, carbonated ice cubes are produced and the gas, or other carbonating medium, confined within the ice is held therein and cannot be released until the ice is melted, which is at the time said ice is placed in a beverage. The melting of the ice within the beverage will release the gas, which has been frozen therein, and will thus add carbonation to said beverage. If desired, the transverse partitions 16 could be omitted and a solid block of carbonated ice, instead of cubes, could be produced.

The construction of the tray 13 is substantially the same as any of the usual refrigerator trays 12 and if it is not desired to carbonate the ice, the cover 17 may be omitted and the tray 13 used in the usual manner.

In Figure 6, a slightly modified form of the invention is shown, in which a tray 13' is formed with a sump or recess 20' for receiving the bulb or cartridge 24. This recess is shown in the bottom of the tray but it could be located in the sides thereof. Of course, in this form, the top 17' does not have the recess as in the first form, but said top merely serves as a closure. When the bulb is placed in the recess 20', it is pierced by the nozzle 21 which is located therein and the gas from the bulb is released into the interior of the tray. The bulb is held within the recess 20' by a retaining clip 25' and manifestly, the carbonation of the liquid within the tray is accomplished in the same manner as above set forth. It is pointed out that it might be desirable to also flavor the liquid to form a flavored, carbonated ice and in such case, the liquid would be suitably admixed with a flavoring syrup or extract prior to its introduction into the tray.

What I claim and desire to secure by Letters Patent is:

1. A tray for receiving liquid to be frozen and adapted to be inserted into the freezing chamber of a mechanical refrigerator, a closure for the tray, a bulb having a carbonating medium therein removably mounted on the tray, means for releasing the carbonating medium from within the bulb into the interior of the tray when the bulb is placed in position on the tray, whereby the liquid within said tray may be carbonated and when frozen forms carbonated ice, and means for dividing the interior of the tray into cubical compartments whereby the liquid is frozen into ice cubes.

2. A tray for receiving liquid to be frozen, a closure removably secured to said tray to close the same, said closure having a recess adapted to receive a bulb containing a carbonating medium, and means mounted in said closure and adapted to engage the bulb when the same is in position within the recess for releasing the carbonating medium from the bulb and conducting it to the interior of the tray, whereby the liquid within the tray may be carbonated and when frozen forms carbonated ice.

3. A tray for receiving liquid to be frozen, a closure removably secured to said tray to close the same, said tray having a recess adapted to receive a bulb containing a carbonating medium, and means mounted in said tray and adapted to engage the bulb when the same is in position within the recess for releasing the carbonating medium from the bulb and conducting it to the interior of the tray, whereby the liquid within the tray may be carbonated and when frozen forms carbonated ice.

4. A tray for receiving liquid to be frozen, a closure removably secured to said tray to close the same, said closure having a recess adapted to receive a bulb containing a carbonating medium, and a nozzle having a bore extending therethrough mounted in the closure and having one end projecting into the recess and its other end communicating with the interior of the tray, said nozzle being located so as to pierce one end of the bulb when the latter is in position within the recess, whereby the carbonating medium from the bulb may flow through the bore of the nozzle and into the interior of the tray to carbonate the liquid therein.

5. A tray for receiving liquid to be frozen, a closure removably secured to said tray to close the same, said closure having a recess adapted to receive a bulb containing a carbonating medium, a nozzle having a bore extending therethrough mounted in the closure and having one end projecting into the recess and its other end communicating with the interior of the tray, said nozzle being located so as to pierce one end of the bulb when the latter is in position within the recess, whereby the carbonating medium from the bulb may flow through the bore of the nozzle and into the interior of the tray to carbonate the liquid therein, and means for retaining the bulb within the recess to prevent its accidental removal therefrom.

6. A tray for receiving liquid to be frozen, a closure removably secured to said tray to close the same, said tray having a recess adapted to receive a bulb containing a carbonating medium, and a nozzle having a bore extending therethrough mounted in the tray and having one end projecting into the recess and its other end communicating with the interior of the tray, said nozzle being located so as to pierce one end of the bulb when the latter is in position within the recess, whereby the carbonating medium from the bulb may flow through the bore of the nozzle and into the interior of the tray to carbonate the liquid therein.

7. A freezing tray for receiving liquid to be frozen and having a recess in one wall thereof for receiving a commercial bulb or cartridge containing a carbonating gas, whereby the bulb is disposed within the normal outlines of said tray, and means for releasing the gas from said bulb into the interior of the tray to carbonate the liquid therein.

8. A tray for receiving liquid to be frozen and adapted to be inserted into the freezing chamber of a mechanical refrigerator, a closure for the tray, a bulb having a carbonating medium therein, means for removably mounting the bulb on the tray so that said bulb is co-extensive with one surface of said tray, and means for releasing the carbonating medium from within the bulb into the interior of the tray when the bulb is in position on said tray, whereby the liquid within said tray may be carbonated and when frozen forms carbonated ice.

9. A tray for receiving liquid to be frozen and adapted to be inserted into the freezing chamber of a mechanical refrigerator, a closure for said tray, means for dividing the interior of the tray into cubical compartments, a container having a carbonating medium therein mounted on the exterior of the tray and lying within the normal outlines of said tray, whereby said container does not interfere with the insertion of the tray into the chamber, and means for releasing the carbonating medium from the container into the interior of the tray, whereby the liquid therein may be carbonated and when frozen forms carbonated ice cubes.

NOLAN GLAZER.